Figure 1:
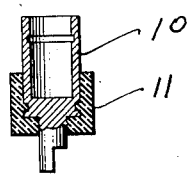

Oct. 23, 1934.  F. GROFF  1,977,876
MOLDED ARTICLES CONTAINING INSERTS
Filed Nov. 20, 1929

INVENTOR.
Frazier Groff
BY
ATTORNEYS.

Patented Oct. 23, 1934

1,977,876

UNITED STATES PATENT OFFICE 1,977,876

MOLDED ARTICLES CONTAINING INSERTS

Frazier Groff, Verona, N. J., assignor to Bakelite Corporation, New York, N. Y., a corporation of Delaware Application November 20, 1929, Serial No. 408,679

12 Claims. (Cl. 18—59)

The invention relates to molded articles provided with metal or similar inserts and in particular to articles of this nature designed for electrical purposes. Illustrative of such articles are distributor heads used in automobile ignition systems.

On account of the present day demands for higher voltages in ignition systems the problem of adequate insulation of inserts in distributor heads has become a serious one in view of the temperatures to which they are simultaneously subjected. As hitherto constructed, distributor heads or caps are made by mounting the inserts in a mold and then molding a plastic composition about them. This composition is a mixture of a filler such as wood flour with a phenol-formaldehyde resinous condensation product that is in a fusible or potentially reactive condition. During the molding operation heat is applied to transform the resinous binder to an infusible condition. The insulation property of the molded composition is found to be considerably reduced when the temperatures under which the article is used become elevated to about 95 to 120° C., and so much so that it is liable to fail under the voltages now demanded. This condition can be improved by thoroughly drying the molding material before molding or by afterbaking the molded article, but on account of the reactive nature under the application of heat of the material used it is difficult to secure uniformity by these methods.

According to the present invention this objection to phenolic composition is overcome by first molding about the metal inserts a composition that includes a resinoid in reactive condition obtained by digesting for example, a mixture of about 300 parts by weight of tung oil with about 200 parts of phenol or equivalent amount of any other suitable phenol in the presence of phosphoric acid or other catalyst at a temperature of about 200° C. for about 5 hours and the resulting viscous mass further reacted with about 25 parts of hexamethylenetetramine until the mass is again viscous. Varying amounts of cresol or other phenols can be added to the mass with the hexamethylene and the latter increased in amounts to react in resinoid proportions with the additional cresol or other phenol, and the hexamethylene may be substituted in whole or in part by some other methylene-containing agent as paraform. To this resinoid mass, which is herein termed a phenol-oil resinoid, is added benzol or other suitable volatile solvent to make a varnish, and a molding mixture is prepared by impregnating about 3 parts of cotton flock or other suitable filler with sufficient varnish to leave about 2 parts of resinoid upon removal of the solvent by drying at moderate temperatures, that is, temperatures below 100° C. or below that at which the resinoid is transformed to a substantial degree. The composition is passed between moderately heated rolls until a consistency and homogeneity desired for molding is reached. This composition when molded under heat and pressure is characterized by a high dielectric strength of about 650 to 700 volts per mil at room temperatures and at elevated temperatures by a strength of from 3 to 10 times that of the usual molded phenol-formaldehyde compositions, depending on the degree of temperature elevation. Changes in the ingredients and the proportions may be made.

The phenol-oil resinoid compositions described have the further useful property that they are capable of being remolded; that is, the molding property is not exhausted with the first molding operation and they can be reworked into other shapes. Accordingly the inserts with the molded sheaths or coverings can be mounted in a mold and the customary phenol-formaldehyde compositions molded about them without cracking or destroying the previously molded sheaths. Furthermore it is found that by so doing the sheath composition welds with a phenol-formaldehyde composition to form a continuous article. By this procedure the speed of molding which is possible with phenol-formaldehyde compositions is retained and the superior electrical properties of the phenol-tung oil resinoid composition are imparted to the molded articles.

Figure 2:
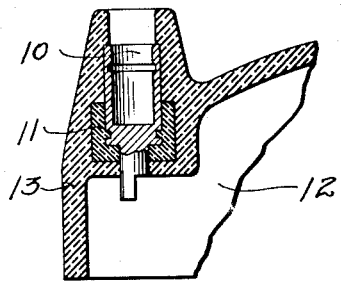

As illustrative of the invention an embodiment is shown in the accompanying drawing in which Fig. 1 is a cross-section of an insert with a molded sheath about it; and Fig. 2 is a fragmentary cross-section of a distributor head showing the insert with its molded sheath as part of a distributor head.

The metal insert 10 as shown in Fig. 1 has molded about it a sheath 11 of the phenol-oil resinoid composition. In Fig. 2 the insert 10 with its sheath 11 is shown molded in place in a distributor head 12 from the usual type of molding composition 13. As illustrated the sheath 11 is applied about a portion only of the insert to take care of mechanical stresses. The sheath can of course be extended to include the whole length of the insert to take advantage of its superior electrical properties.

In practice it is found that a sheath or covering of about 1/16" to 1/8" in thickness about the metal insert of the phenol-oil resinoid composition is sufficient to take care of the increased voltages now in use or suggested for distributor heads for ignition systems at the temperatures of 95 to 120° C. The phenol-oil resinoid composition is molded about an insert in a mold of suitable proportions by subjecting the composition to a pressure which may vary from about 250 pounds per square inch to about 1000 pounds per square inch or more and at temperatures of about 165° C. for about ten minutes or until the composition has set. The molded article is discharged hot and preferably submitted to a baking overnight or about 16 hours at 120° C., as the baking improves its electrical characteristics. The covered insert is then placed in the distributor head mold and the usual phenol-formaldehyde mixture molded about it under the customary conditions.

While the invention is herein described in connection with distributor heads, it is evident that it does not lie in such a specific application and that it is of general utility in the field of molded articles containing inserts. Furthermore while it primarily relates to articles molded from phenol-formaldehyde compositions, it is applicable to articles made from phenol-oil or other compositions particularly those wherein it is found desirable to insure good dielectric conditions about an embedded conductor.

I claim:

1. In an article containing an insert and molded from a phenol-formaldehyde composition, a covering of a phenol-fatty oil reaction resinoid composition in contact with the insert.

2. In an article containing an insert a covering of a phenol-fatty oil reaction resinoid composition in contact with the insert.

3. An article containing a conductive element and having insulation made from a phenol-fatty oil reaction resinoid composition in contact with said element.

4. A process of making articles with inserts which comprises molding a phenol-fatty oil reaction resinoid composition in contact with an insert, baking the insert and contacting composition, and molding additional amounts of a moldable composition about the insert and its contacting composition to form an article.

5. A process of making articles with inserts which comprises molding a phenol-fatty oil reaction resinoid composition in contact with an insert, and molding additional amounts of a moldable composition about the insert and its contacting composition to form an article.

6. In an article containing an insert and molded from a phenolic composition, an insulating medium in contact with the insert comprising an oil-containing composition welded with the phenolic composition.

7. In an article containing an insert and molded from a phenolic aldehyde composition, a covering of a phenol-fatty oil reaction resinoid composition in contact with the insert and having a dielectric strength from substantially 650 to substantially 700 volts per mil.

8. In an article containing an insert and molded from a phenolic aldehyde composition, a covering of a phenol-fatty oil reaction resinoid composition in contact with the insert and having a dielectric strength above substantially 650 volts per mil.

9. In an article containing an insert and molded from a phenolic aldehyde composition, a covering of a phenol-fatty oil reaction resinoid composition in contact with the insert and having a dielectric strength from substantially 3 to substantially 10 times that of said phenolic-aldehyde composition.

10. In an article containing an insert and molded from a phenolic aldehyde composition, a covering of a phenol-fatty oil reaction resinoid composition in contact with the insert and having a dielectric strength above substantially 3 times that of said phenolic-aldehyde composition.

11. Molded article provided with an insert comprising in combination an insert, a covering about the insert including a reaction product of a phenol, a fatty oil and a methylene agent, and a composition including a reaction product of a phenol and a methylene agent as the body of the article.

12. Molded article provided with an insert comprising in combination an insert, a covering about the insert including a reaction product of a phenol, a fatty oil and a methylene agent, and a heat-hardened composition as the body of the article.

FRAZIER GROFF.